March 7, 1967 D. A. BROWN ETAL 3,307,397
LIQUID LEVEL INDICATORS
Filed March 15, 1965 2 Sheets-Sheet 2
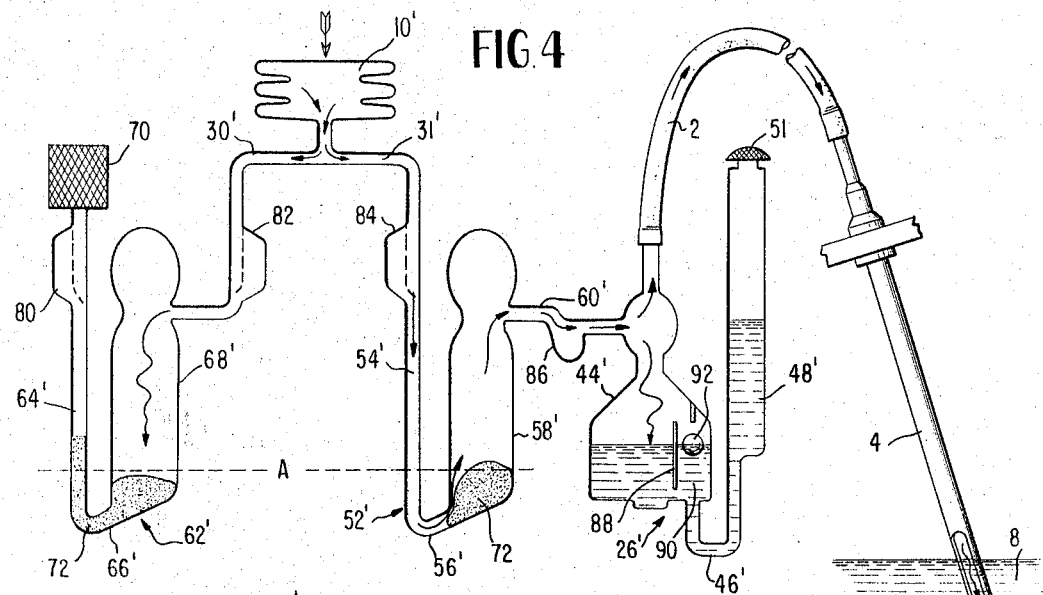
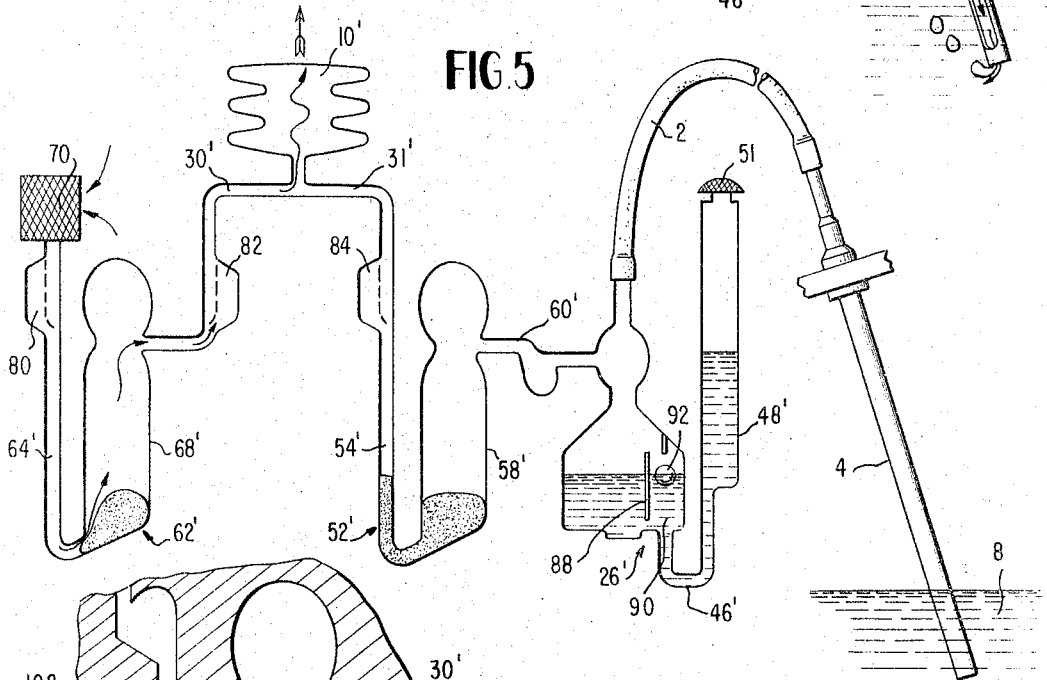
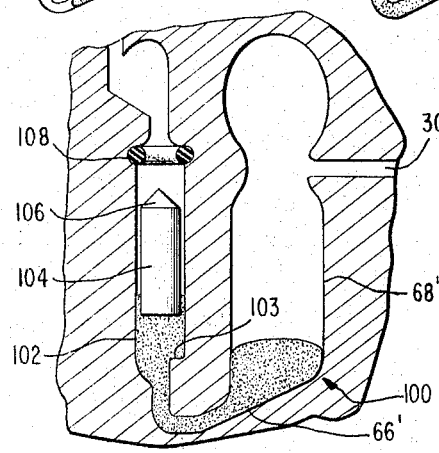
INVENTORS
DAVID A. BROWN
BERNARD S. BENSON
ATTORNEYS United States Patent Office 3,307,397
Patented Mar. 7, 1967

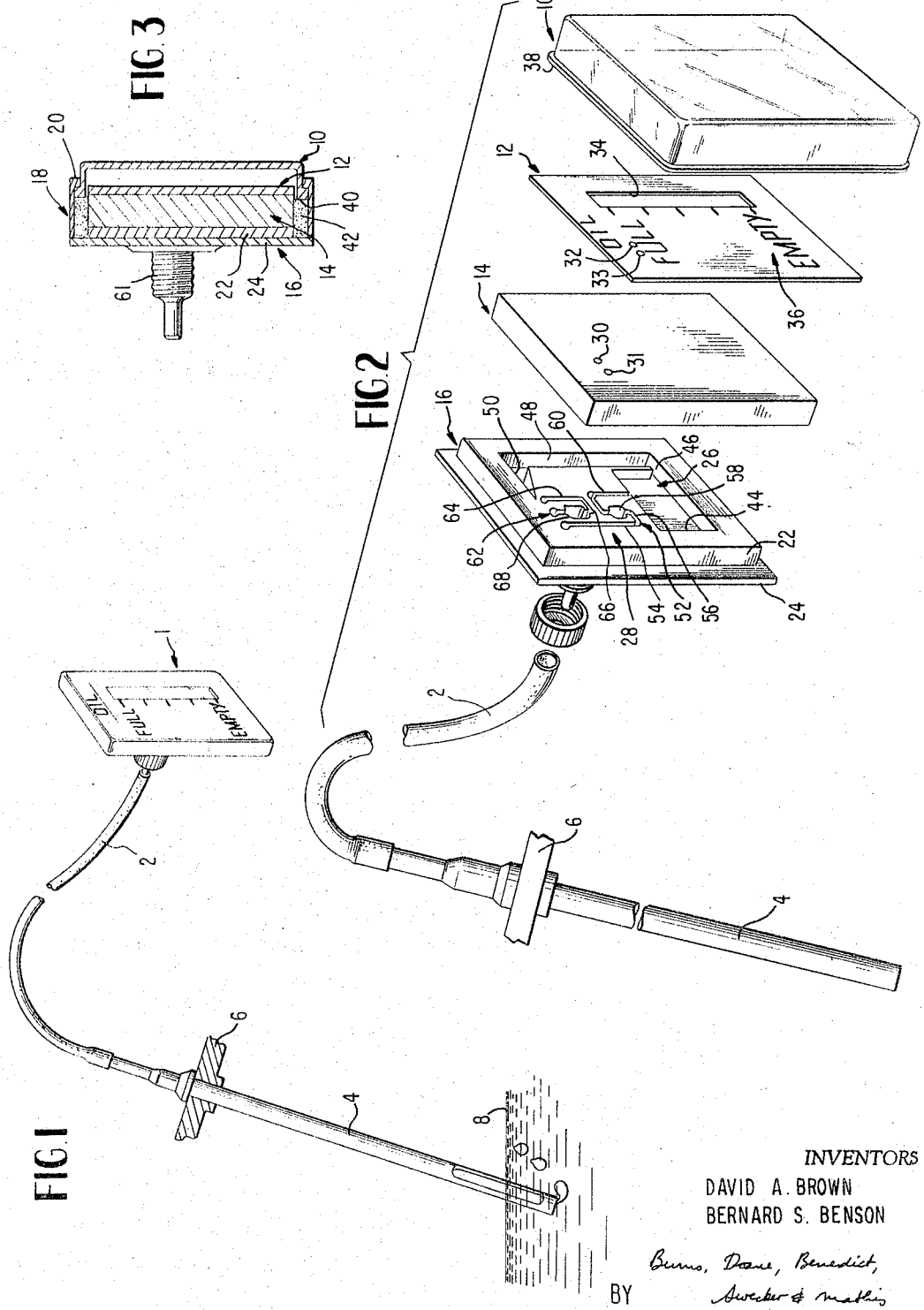

3,307,397
LIQUID LEVEL INDICATORS
David A. Brown, 4305 Sulgrave Road, Richmond, Va. 23221, and Bernard S. Benson, Chateau de Chaban, St. Leon-sur-Vezere, Dordogne, France
Filed Mar. 15, 1965, Ser. No. 439,692
Claims priority, application France, Aug. 20, 1964, 985,780
6 Claims. (Cl. 73—302)

This invention relates to measuring devices and, more specifically, to gauges or indicators of the type for measuring liquid level in a reservoir.

Heretofore liquid level indicators have been available of the type comprising a U-shaped manometer, a conduit one end of which is connected to one leg of the U-shaped manometer, the other end of which is submerged in a liquid in a remote reservoir the level of which is to be ascertained, and a pump interposed within the conduit. The pump is utilized to force gas into the conduit thereby urging liquid out of the submerged end of the conduit. The pressure of the gas in the conduit is dependent upon the pressure head of the liquid above the submerged end of the conduit in the reservoir. Because the one end of the conduit is in fluid connection with one leg of the manometer, the ambient pressure in the conduit acts on the manometric liquid therein to move the same into another leg of the manometer an amount that is proportional to the ambient pressure. In this way the manometer, which is appropriately calibrated, may be utilized to reflect the level of the liquid in the reservoir. To enhance the operational characteristics of such an indicator, valves are sometimes interposed in the conduit. However, the valved indicators heretofore utilized have not always proved satisfactory for a number of reasons. For example, the usually employed valved indicators have been expensive and have not proved reliable or wear-resistant particularly in a dusty environment or one wherein vibrations are prevalent. Further, because of the low operating pressures that are sometimes encountered, securing accurate readings, achieving consistent valve cracking pressures, adjusting the same, and securing efficient sealing thereafter to maintain the reading, has been problematical.

In recognition of the need for an improved liquid level indicator of the type heretofore described it is an object of the present invention to provide such an indicator which substantially obviates or minimizes problems such as heretofore noted.

It is a particular object of this invention to provide a liquid level indicator of the manometer-type which is inexpensive and accurate over a wide range of environmental pressures.

It is another object of this invention to provide a liquid level indicator of the manometer-type not prone to malfunction or inaccuracies in a dusty or vibrating environment.

It is a further object of this invention to provide such a manometer-type liquid level indicator wherein an indication of the liquid level, as reflected by the manometer, is maintained over an extended period of time.

Another object of this invention is to provide a manometer-type liquid level indicator that is adapted for use in a low pressure environment but is conveniently modified for utilization over a wide range of operating pressures.

It is still another object of this invention to provide a manometer-type liquid level indicator wherein safeguards are provided against the loss of manometric liquid at inordinately high environmental pressures.

In achieving these and other objects, as will become apparent hereinafter, the present invention provides a liquid level indicator comprising a gauge including a U-shaped conduit, manometric liquid in the U-shaped conduit, and a source of gas under pressure. A first conduit means is provided one end of which connects the source of gas under presure and one leg of the U-shaped conduit and the other end of which connects to a vent venting the source to the atmosphere. Valve means are provided in the first conduit between the vent and the source and between the source and the one leg of the U-shaped conduit, respectively, at least one of said valve means including a conduit having a U-shaped portion, manometric liquid in the U-shaped portion, and a second conduit means connecting said one leg with a reservoir, one end of the second conduit means adapted to be immersed in the liquid in the reservoir the level of which is to be read.

In describing the invention reference will be made to a preferred embodiment and several modifications thereof illustrated by way of example in the accompanying drawings, in which:

FIGURE 1 is a perspective view of a liquid level indicator one end of which is immersed in the liquid of a reservoir the level of which is to be read according to the present invention;

FIGURE 2 is an exploded perspective view of the liquid level indicator shown in FIGURE 1;

FIGURE 3 is a cross sectional view of the indicator pump elements of the liquid level indicator shown in FIGURES 1 and 2;

FIGURE 4 is a schematic view of a modified form of a liquid level indicator according to the present invention in one operational stage;

FIGURE 5 is a schematic view of the liquid level indicator shown in FIGURE 4 at another operational stage thereof; and FIGURE 6 is a fragmentary view of a modification of the intake valve shown in FIGURES 4 and 5 of the present invention.

Referring in more detail to FIGURE 1 of the drawings, a liquid level indicator according to the present invention includes an indicator and pump element 1 connected by a flexible conduit 2 to a tubular reservoir dipstick 4. The dipstick 4 is mounted in a housing 6 of a reservoir and the lower end thereof is immersed in a liquid 8 the level of which is to be read. A typical application of the present indicator is in an automotive vehicle and would involve mounting the indicator element 1 on the dashboard of the automobile in a position within easy reach of the operator and installing the dipstick 4 in the crankcase of the vehicle engine to read the oil level thereof.

Referring to FIGURE 2, the indicator and pump element 1 comprises, front to rear, a transparent cover 10 constructed of elastically deformable material, such as plastic or the like, an opaque face plate 12, a transparent sealing plate 14, and a base plate 16. In its assembled condition, as shown in FIGURE 3, a rectangular side wall 18 having a rectangular, inwardly directed flange 20 on the front end thereof is fixedly connected at its rear end to the base plate 16, as by adhesive or the like, about the rectangular periphery thereof.

The base plate 16 comprises a rectangular block 22 centrally disposed on a rear plate 24 of increased length and width relative to the block 22. The forward face of the block 22 is provided with a generally U-shaped manometer cavity 26, as well as a valve cavity or conduit system 28, the construction and operation of which will be discussed hereinafter.

The sealing plate 14, affixed by adhesive or the like to the block 22, comprises a rectangular plate of transparent material, such as plastic or the like, including a pair of intake and exhaust ports 30, 31, respectively, through an upper left hand corner thereof. The ports 30, 31 are adapted to cooperate with the valve system 28 in a manner to be subsequently described.

The face plate 12 is constructed of an opaque material and is fixedly connected, as by adhesive or the like, to the front face of the sealing plate 14. The face plate 12 is provided with intake and exhaust apertures 32 and 33, respectively, and an elongated, vertically extending, rectangular slot 34 along a lateral edge thereof. Appropriate indicia 36 representing, for example, the amount of oil in an automobile engine crankcase, is provided on the face thereof adjacent the slot 34.

The cover 10, constructed of a transparent elastically deformable material such as plastic or the like, is provided with a rectangular flange 38 on the inner end thereof which is adapted to be received within and abut the inside face of the flange 20 on the sidewall 18. As shown in FIGURE 3 of the drawings, the inner face 40 of the cover flange 38 abuts another face of a rectangular band 42 of a resiliently compressible material such as foam rubber or the like, which is positioned about the block 22 and sealing plate 14. The inner end of the band 42 abuts the inner face of the rear plate 24.

The U-shaped manometer cavity 26 comprises a short leg 44 connected by a horizontally disposed leg 46 to an elongated, vertically extending indicating leg 48 of a relatively decreased diameter. At the upper extent of the indicating leg 48 an upper horizontally extending cavity leg 50 is provided, the inner end of which communicates with a bore, suitably filtered (not shown) through the block 22 and the rear plate 24 to vent the upper end of the indicating leg to the atmosphere. Manometric liquid such as mercury or glycol may be inserted in the manometer cavity 26, the level thereof tending to equalize between the short leg 44 and the elongated leg 48. Upon assembly of the indicator 1, the level of the manometric liquid in the leg 48 is viewable through the transparent sealing plate 14, the elongated slot 34 and the transparent cover 10.

The valve cavity or conduit system 28 in the block 22 comprises an exhaust valve cavity 52 including an elongated inlet groove 54 the lower end of which is connected by a horizontally extending groove 56 to a lower end of a vertically extending outlet groove 58 of an increased diameter relative to the inlet groove 54. An upper end of the outlet groove 58 is connected by suitable groove 60 to the upper end of the short leg 44 of the manometer cavity 26.

Positioned adjacent the exhaust valve cavity system 52 in the block 22 is an intake valve cavity system 62. The intake valve cavity system 62 comprises an inlet groove 64 the upper end of which communicates with a bore, suitably filtered (not shown), through the block 22 and rear plate 24 to vent the upper end thereof to the atmosphere. The lower end of the intake groove 64 is connected by a horizontal groove 66 to a lower end of an outlet groove 68 of an increased diameter relative to the intake groove 64.

The exhaust and intake valve systems are so termed because they exhaust air from, or take air into, the system, respectively.

Prior or subsequent to fixing of the sealing plate 14 on the base 16 so as to form the various grooves into conduits, manometric liquid, such as mercury or the like, is positioned within the manometer cavity 26, for indicating purposes, as well as in the U-shaped portion of the intake and exhaust valves 62 and 52, respectively, for valve sealing purposes. When the indicator 1 is assembled, the intake apertures 30, 32 in the sealing plate 14 and the face plate 12, respectively, are aligned with the upper end of th inlet groove 68 of the intake valve groove system 62. Likewise the exhaust apertures 31 and 33 in the sealing plate 14 and the face plate 12, respectively, are aligned with the upper end of the inlet groove 54 of the exhaust valve groove system 52.

It should be noted that the rear face of the sealing plate 14 may be planar or may be provided with a groove system that is complementary to the manometer cavity 26 and the valve system cavity 28 to increase the liquid capacity of these cavities.

The groove 60 connecting the upper end of the exhaust valve outlet groove 58 to the short leg 44 of the manometer cavity 26 is in fluid connection with a bore (not shown) through the block 22 and rear plate 24, this bore terminating in fluid connection with a suitable threaded connector 61 adapted to place the system in fluid connection with the flexible conduit 2 connected with the dipstick 4.

The operation of the fluid level indicator according to the present invention, as when installed in an automotive vehicle, may be summarized as follows. The indicator-pump 1 is positioned on the vehicle dashboard within convenient reach of the operator. The operator may then urge the cover 10 inwardly within the sidewall 18 against the elastic action of the band 42. Such action decreases the volume between the inside face of the cover 10 and the face plate 12 thereby forcing air through the exhaust apertures 33 and 31 in the face plate 12 and the sealing plate 14, respectively, into the upper end of the inlet groove 54 of the exhaust valve cavity system 52. Additionally, air will be forced through the intake apertures 32 and 30 in the face plate 12 and the sealing plate 14, respectively, into the upper end of the outlet groove 68 of the intake valve cavity system 62. Return of the cover 10 to its initial condition is caused by the resilient band 42.

As will be explained more fully hereinafter, the exhaust and intake valve systems, 52 and 62, respectively, are so arranged to direct the air expelled by inward movement of the cover 10 to the flexible conduit 2 to evacuate the liquid 8 in the lower end of the dipstick 4. Depending upon the level of the liquid 8 in relation to the lower end of the dipstick 4, a gas pressure is developed within the system as required to offset the pressure head of the liquid 8. This gas pressure acts upon the manometric liquid in the short leg 44 of the manometer cavity 26 to raise the manometric liquid in the elongated indicating leg 48 thereof. The increase in the level of the manometric liquid in the indicating leg 48, when viewed through the properly calibrated slot 34 of the face plate 12, is proportional to the pressure in the system, the pressure head of the liquid 8 about the submerged end of the dipstick 4, upon expelling liquid therefrom and consequently, within limits, the amount of liquid in the reservoir 6.

This action is achieved in a manner that will be explained in more detail in the following discussion of a modified form of a liquid level indicator according to the present invention.

Referring to FIGURE 4 of the drawings a modified form of the liquid level indicator therein is schematically illustrated. Equivalent elements, relative to the embodiment shown in FIGURE 2, are noted by a like numeral with a prime (') added thereto.

In this embodiment a gas or air pump 10' of any suitable type is provided in fluid connection with a manometer cavity 26' forming a part of an appropriate indicator similar to that shown in FIGURE 1. The manometer cavity 26' is in fluid connection with a flexible conduit 2 connected to a dipstick 4 the lower end of which is submerged in the liquid in a reservoir the level of which is to be indicated.

As in the embodiment shown in FIGURE 2, an exhaust valve 52' is interposed between the pump 10' and the manometer 26'. An intake valve 62' is interposed between the pump 10' and a suitably filtered vent 70 to the atmosphere. The pump 10' is connected by a suitable conduit 31 to an inlet conduit 54' of the exhaust valve 52'. At the lower extremity of the inlet conduit 54' a generally horizontally disposed conduit 56' is provided in fluid connection with a lower end of an increased diameter outlet conduit 58'. A suitable conduit 60' is provided to place an upper extremity of the outlet conduit 58' in fluid connection with an upper extremity of a short leg 44' of the manometer 26' and the flexible connector 2.

As in the embodiment shown in FIG. 2, the short leg 44' of the manometer 26' is of a relatively increased width as to an elongated indicating leg 48' the lower ends of which are connected by a horizontal leg 46'.

A suitable conduit 30 connects the pump 10' to an upper end of an outlet conduit 68' of the intake valve 62', the outlet conduit 68' being of an increased diameter relative to the inlet conduit 64'. The upper end of the inlet conduit 64' is connected to the vent to the atmosphere 70 and the lower end is placed in fluid communication with a lower end of the outlet conduit 68' by a generally horizontally disposed conduit 66'.

Thus far it will be seen that the embodiments shown in FIGURES 2 and 4 are equivalent in construction. The conduits of the indicator shown in FIGURE 4 may be formed in a manner similar to the grooves in the block 22 closed by the sealing plate 14 of the embodiment shown in FIGURE 2.

Operation of an indicator according to the present invention is as follows. Referring to FIGURE 4, upon exerting a compressive force on the pump 10', gas or air is forced into the conduits 30', 31' to be directed against manometric liquid 72 such as mercury or the like, in the U-shaped portions of the exhaust and intake valves 52' and 62', respectively. It should be understood that, initially, the manometric liquid assumes a generally equal level in each of the inlet and outlet conduits of the exhaust and intake valves 52' and 62', respectively, as indicated by line A in FIGURE 4, and thereby functions as a valve seal. Of course, in operation the effect of capillary action is such that the liquid level in the narrower conduits may be slightly lower than the level in the cooperating wider conduit. However, upon being acted upon by the air under pressure from the pump 10', the manometric liquid is urged from the inlet conduit 54' of the exhaust valve 52' towards the outlet conduit 58' thereof. Likewise, the manometric liquid in the outlet conduit 68' of the intake valve 62' is urged toward the inlet conduit 64' thereof. However, lower gas pressure is required to move the manometric liquid out of the narrow intake conduit 54' of the exhaust valve 52' into the wide outlet conduit 58' thereof than is required to move the manometric liquid out of the wide outlet conduit 68' of the intake valve 62' into the narrow inlet conduit 64' thereof. This is because such movement entails a differential presure head as will be apparent by the relative portions of these conduits shown in the drawings. Therefore, the inlet conduit 54' of the exhaust valve 52' is first cleared of manometric liquid. When the manometric liquid is moved entirely into the wide outlet conduit 58' of the exhaust valve 52', as shown in FIGURE 4, gas or air is free to surge by interface of the conduit and the manometric liquid such as mercury. This is because the liquid assumes the form of a globule by virtue of surface tension and other factors. The gas is then directed through the conduit 60' into the short leg 44' of the manometer 26'. Such action occurs before the manometric liquid is entirely moved out of the side outlet conduit 68' of the intake valve 62' into the narrow intake conduit 64' thereof. For this reason, a barrier against the passage of air thereby is maintained.

The gas under pressure in the short leg 44' of the manometer 26' is directed through the flexible conduit 2 down through the tubular dipstick 4 to expel any liquid in the submerged end thereof. However, to expel such liquid in the submerged end of the dipstick 4 an air pressure must be developed that is equal to the pressure head liquid 8 acting at a point equal to the elevation of the lower end of the submerged dipstick 4. This pressure likewise acts against the upper surface of the manometric liquid in the short leg 44' of the manometer 26' so as to move the liquid therein proportionally higher into the elongated indicating leg 48' thereof. Such action is permitted because the upper end of the indicating leg 48' is vented to the atmosphere as at a suitably filtered vent 51. At this point, one desiring to ascertain the level of the liquid 8 in the reservoir may view the level of the manometrical liquid in the indicating leg 48', as through the calibrated slot 34 in the face plate 12 of the gauge shown in FIGURES 1 and 2.

Upon release of the compressive forces acting against the pump 10' the internal volume thereof tends to expand and exert a sucking action on the manometric liquid 72 by virtue of a partial vacuum within the pump 10'. At this point, reverse forces act against the intake and exhaust valves 62' and 52', respectively. Because the manometric liquid in the narrow inlet conduit 64' of the intake valve 62' may be expelled at a lower pressure than the liquid is expelled from the wide outlet conduit 58' of the exhaust valve 52', gas or air from the vent 70 is sucked into the pump 10' to equalize the vacuum caused by the expansion thereof.

Upon equalization of the vacuum in the pump 10' the manometric liquid 72 in the U-shaped portions of the exhaust and intake valves 52', 62', respectively, once again assumes an approximately equal level in each of the legs thereof, thereby forming a barrier and effectively blocking leakage of air thereby. Since no gas is permitted to escape from the short leg 44' of the manometer 26' during this process, the reading achieved in the indicating leg 48' of the manometer is maintained at a constant level over an extended period of time.

Since the cracking pressure of the intake and exhaust valves 62' and 52' may be modified by the addition or subtraction of manometric liquid from the U-shaped portions thereof, the instant valve lends itself to application over a wide range of pressures. Further, because any dust that might enter the system, as through the vents 70 and 51, will merely float on the surface of the manometric liquid in the various U-shaped portions of the system, such dust will not have an adverse effect on the operational qualities of the system nor will leaks be induced thereby which might affect the maintenance of a reading in the indicating portion 48' of the manometer 26'.

Because of the reverse orientation of the wide and narrow conduits of the intake and exhaust valves 62', 52' of the system, proper operation of the system is insured such that pressurized air is directed to the manometer and dipstick when desired but the system may be vented to the atmosphere as subsequently required. It will be appreciated that if the system were not vented in the proper manner, loss of liquid from the manometer 26' and the detrimental effects on the accuracy of the indicator might thereby be incurred.

It should also be noted that production of the instant indicator incurs a minimum of expense because delicate or complicated check valve systems which are sometimes prone to malfunction because of dust or vibration, are eliminated in favor of an inexpensive differential mercury valve arrangement that is ideally suited to a broad range of applications.

With further reference to the modified form of liquid level indicator shown in FIGURE 4, attention is invited to the various features not included in the embodiment shown in FIGURE 2. Basically, these features are included to guard against loss of manometric liquid from the valves and manometer. For example, should the pressure required to expel the liquid 8 from the lower end of the dipstick 4 be extraordinarily great, such as in an automobile crank case having plugged breathers resulting in high crank case pressure, operation of the pump 10' might entail such high pressure as to force the manometric liquid in the intake valve 62' out through the breather 70. Similarly, the liquid in the exhaust valve 52' might be moved through the conduit 60' into the manometer thereby destroying effective operation of the indicator. To circumvent this possibility, liquid traps or receivers 80, 82, 84 and 86 are provided in the inlet conduit 64' of the intake valve 62', in the conduit 30' between the intake valve 62' and the pump 10', in the conduit 31' between the pump 10' and the exhaust valve 52', and between the conduit 58' of the exhaust valve 52' and the manometer 26', respectively. In each case the function of these liquid receivers is to provide an increased volume or trap to catch any manometric fluid that might be extraordinarily moved to the location thereof and to return it on the next cycle to the original cavity.

Similarly, to guard against such extraordinary high pressure, the short leg 44' of the manometer 26' is provided with a vertically extending partition 88 partially segregating a chamber 90 in which a spherical ball 92 is free to float at the upper surface of the manometric liquid therein. Upon the extraordinary occurrence of a pressure sufficient to expel all of the liquid from the short leg 44' of the manometer 26' into the indicating leg 48', it is necessary to guard against the movement of liquid in the indicating leg 48' up to and through the vent 51. Should nearly all the liquid be expelled from the short leg 44', the ball 92 will seat at the port connecting the short leg 44' with the horizontal extending leg 46' and thereby block further action of the gas pressure on the liquid in the indicating leg 48'.

A similar safety feature is shown in FIGURE 6 wherein a modified form of intake valve 100 is shown. This intake valve 100 is similar to that shown in FIGURE 4 having a conduit 30' in fluid communication with the pump 10' and the upper end of a wide outlet conduit 68' of the valve. A horizontally extending conduit 66' connects the lower end of the wide outlet conduit 68' with the lower extremity of a narrow inlet conduit 102 the upper end of which is in fluid communication with a vent to the atmosphere similar to that shown by 70 in FIGURE 4. The lower extremity of the conduit 102 has a shoulder 103 to circumvent sealing of a lower end of a cylindrical check valve 104 at this point. To guard against the possibility of loss of manometric liquid through the vent 70, the cylindrical check valve 104 is positioned to float on the upper surface of the liquid in the narrow inlet leg 102. The upper periphery of the cylindrical check valve 104 is provided with a tapered portion 106 adapted to sealingly engage an O-ring 108 in the upper periphery of the conduit 102 of the intake valve 100. Upon the migration of an inordinate amount of mercury from the wide outlet conduit 68' into the narrow inlet conduit 102, the tapered portion of the cylindrical check valve 104 is seated against the O-ring 108 thereby prohibiting migration of liquid past this sealing point and out through the vent 70.

These latter features, in addition to safeguarding against undesired migration of manometric liquid also make possible a reduction in the required lengths of the valving system and manometric conduits.

It should be noted that a safeguard against undesired movement of manometric liquid is provided in all the embodiments of the present indicator by the provision of relatively reduced diameter conduits leading to and from the various valves and manometers. This is so because entry of mercury or the like entering such reduced diameters is hampered by virtue of surface tension and other factors.

Additionally, it is significant that the present indicator may be conveniently positioned to compensate for reservoir tilting, which is a frequent occurrence in an automotive application, by placing the short leg of the manometer relative to the indicating leg thereof, in the same relation as the dipstick orientation relative to the center of the reservoir.

It is also worthy of note that the present indicators may conveniently be prepared for shipment by placing suitable plugs in the various vents to the atmosphere and the bore for connection to conduit 2 to forestall loss of manometric liquid as caused by inversion or the like.

In some applications, certain of the advantages afforded by the instant invention are available through utilization of conventional mechanical gauges in combination with the intake and exhaust valve system heretofore disclosed.

Also, it has been found that installation of an indicator according to the present invention for use in connection with pressurized reservoirs may be conveniently achieved by placing certain of the vents of the system in fluid communication with the pressurized chamber above the liquid in the reservoir.

Although the instant invention has been described with reference to only several embodiments, it will be apparent to those skilled in the art that additions, deletions, modifications, substitutions and other changes in the specifically described and illustrated embodiments may be made which fall under the purview of the appended claims.

We claim:

1. A liquid level indicator comprising a gauge including a calibrated U-shaped conduit, manometric liquid in said conduit, a source of gas under pressure, first conduit means connecting said source to one leg of said U-shaped conduit, said first conduit means including a vent venting the source to the atmosphere, said first conduit means including first and second valve means between said vent and said source and between said source and one leg, respectively, at least one of said valve means including a conduit having a U-shaped portion, manometric liquid in said U-shaped portion, and second conduit means connecting said one leg with a reservoir, one end of said second conduit means adapted to be immersed in the liquid in said reservoir, said source of gas under pressure comprises a pneumatic pump formed by a cover movably enclosing one face of said gauge, said cover being constructed of transparent material.

2. A liquid level indicator comprising a gauge including a calibrated U-shaped conduit, and first and second legs, manometric liquid in said conduit, pneumatic pump means, first conduit means connecting said pneumatic pump means to said first leg of said U-shaped conduit, said first conduit means including vent means venting said pump means to the atmosphere, said first conduit means including first and second valve means between said vent means and said pump means and between said pump means and said first leg, respectively, each of said valve means including a conduit having a U-shaped portion including a pair of legs, manometric liquid in said U-shaped portions, one leg of each of said U-shaped portion having a larger diameter than the other leg thereof, and second conduit means connecting said first leg of said calibrated U-shaped conduit with a reservoir, one end of said second conduit means adapted to be immersed in the liquid in said reservoir, said pump means is formed by a cover movably enclosing one face of the said gauge, said cover being constructed of transparent material.

3. A liquid level indicator comprising a gauge including a base means, cover means constructed of transparent material resiliently movably connected to said base means in fluid sealing relation therewith, face plate means having indicia thereon adjacent to a slot therein, interposed between said cover means and said base means, and in spaced relation to said cover means, said base means including a first U-shaped conduit having first and second legs, manometric liquid in said legs, said first leg having a larger diameter than said second leg, a closure element floating in said manometric liquid in said first leg, said closure adapted to seal said first leg from said second leg, said second leg viewable through said slot in said face plate means and having filtered vent means on the upper end thereof venting said second leg to the atmosphere, said base means including first conduit means one end of which is in fluid communication with the space between said cover means and said face plate means, the other end of said first conduit means including filtered vent means venting said conduit to the atmosphere, said first conduit means in said base means including first and second valve means between said vent means and said one end of said first conduit means, respectively, each of said valve means including a conduit having a U-shaped portion including a pair of legs, manometric liquid in said legs, one leg of each of said U-shaped portion having a larger diameter than the other leg thereof, said one leg of said first valve means and said other leg of said second valve means receiving gas through aperture means in said face plate means from the space between said face plate means and said cover means upon movement of said cover means towards said face plate means before such gas is received in said other leg of said first valve means and said one leg of said second valve means, said base means including aperture means connecting an external conduit with said first leg of said first U-shaped conduit, said external conduit in fluid communication with the interior of a tubular dipstick adapted to be immersed in the liquid of a reservoir.

4. A liquid level gauge indicator for measuring the liquid in a liquid reservoir comprising a gauge including a calibrated U-shaped conduit having first and second legs, said first leg being of a larger diameter than said second leg, said second leg having first vent means for venting said second leg to the atmosphere, said first vent means including filter means, manometric liquid in said first and second legs, pneumatic pump means, first conduit means connecting said pneumatic pump means to said first leg of said U-shaped conduit, said first conduit means including second vent means venting said pump means to the atmosphere, said first conduit means including first and second valve means between said second vent means and said pump means and between said pump means and said first leg of said U-shaped conduit, respectively, each of said valve means including a conduit having a U-shaped portion including first and second legs having manometric liquid therein, said second leg of each of said valve means being larger in diameter than said first leg thereof, said second leg of said first valve means and said first leg of said second valve means positioned between said pump means and the other leg of the respective valve means, and second conduit means connecting said first leg of said U-shaped conduit with said liquid reservoir, one end of said second conduit means adapted to be immersed in the liquid in said reservoir.

5. A liquid level gauge according to claim 4 further including check valve means between said first and second legs of said U-shaped conduit.

6. A liquid level gauge according to claim 4 further including check valve means between said first leg of said first valve means and said second vent means.

References Cited by the Examiner

UNITED STATES PATENTS

| | | | |
|---|---|---|---|
| 319,529 | 6/1885 | Thayer | 137—251 |
| 424,162 | 3/1890 | Austin | 137—247.45 |
| 1,821,958 | 9/1931 | Beecher | 73—302 X |
| 2,653,477 | 9/1953 | Hoskins | 73—302 |
| 2,920,159 | 1/1960 | Snyder | 73—401 X |
| 2,929,335 | 3/1960 | Seiler | 137—251 |
| 3,107,534 | 10/1963 | Taylor | 73—401 |

LOUIS R. PRINCE, *Primary Examiner.*

DAVID SCHONBERG, *Examiner.*

F. H. THOMAS, S. C. SWISHER,
*Assistant Examiners.*